United States Patent [19]
Harries

[11] 3,991,573
[45] Nov. 16, 1976

[54] MASTER CYLINDER ASSEMBLIES FOR VEHICLE HYDRAULIC BRAKING SYSTEMS

[75] Inventor: David Anthony Harries, Solihull, England

[73] Assignee: Girling, Limited, Birmingham, England

[22] Filed: Feb. 13, 1975

[21] Appl. No.: 549,476

[30] Foreign Application Priority Data
Feb. 13, 1974 United Kingdom............. 6447/74
June 4, 1974 United Kingdom............. 24597/74
Nov. 30, 1974 United Kingdom............ 51962/74

[52] U.S. Cl. ............................. 60/550; 303/21 F
[51] Int. Cl.² ..................... F15B 7/00; F15B 11/10
[58] Field of Search ............. 60/5, 46, 551, 567, 60/581, 547, 550, 552; 303/21 AF

[56] References Cited
UNITED STATES PATENTS

| | | | |
|---|---|---|---|
| 3,103,786 | 9/1963 | Hager | 60/549 X |
| 3,334,548 | 8/1967 | Van House | 60/550 X |
| 3,431,029 | 3/1969 | Boueil et al. | 60/547 X |
| 3,442,080 | 5/1969 | Rockwell | 60/550 X |
| 3,729,235 | 4/1973 | Bach et al. | 60/549 X |
| 3,789,611 | 2/1974 | Marquardt | 60/581 X |

FOREIGN PATENTS OR APPLICATIONS
365,717    1/1932    United Kingdom............. 60/551

Primary Examiner—Martin P. Schwadron
Assistant Examiner—H. Burks
Attorney, Agent, or Firm—Scrivener Parker Scrivener and Clarke

[57] ABSTRACT

A master cylinder assembly for a vehicle hydraulic braking system comprises a pedal-operated valve assembly for controlling a supply of fluid under pressure to a power chamber in a housing on the opposite side of a piston to a pressure space which has an outlet for connection to a wheel brake, and a second piston is adapted to be applied by the pedal to generate fluid pressure in said pressure space.

32 Claims, 14 Drawing Figures

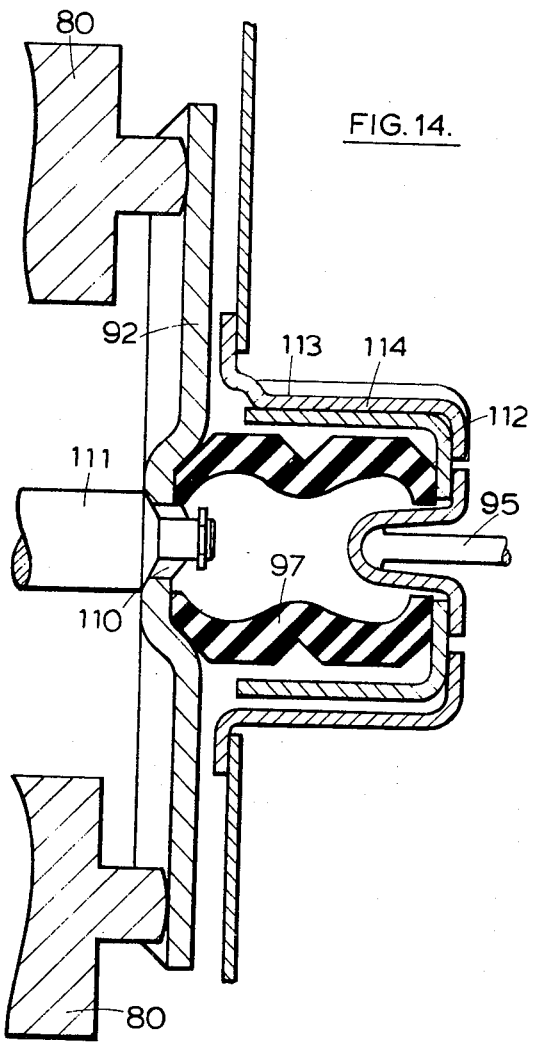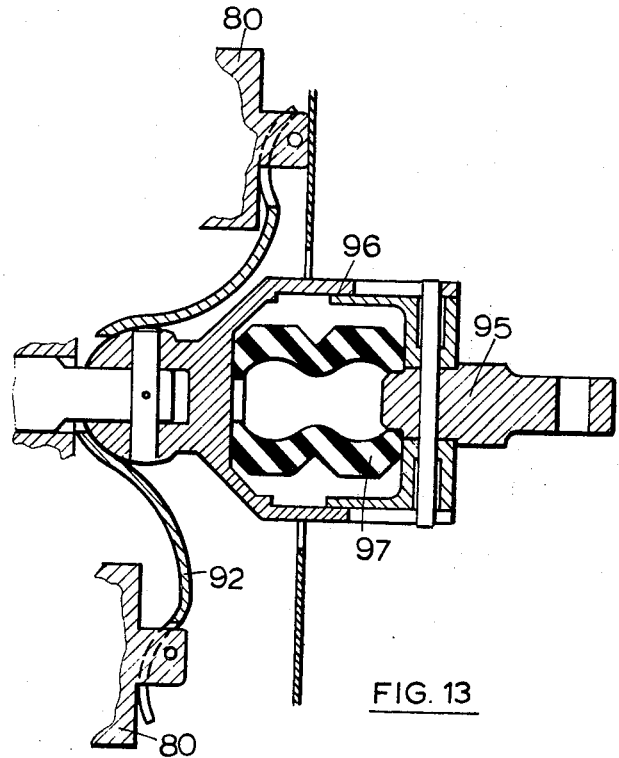

MASTER CYLINDER ASSEMBLIES FOR VEHICLE HYDRAULIC BRAKING SYSTEMS

SPECIFIC DESCRIPTION

This invention relates to master cylinder assemblies for vehicle hydraulic braking systems of the kind comprising a pedal-operated valve assembly for controlling a supply of fluid under pressure to a power chamber in a housing on the opposite side of a piston to a pressure space which has an outlet for connection to a wheel brake.

In power operated master cylinders of this kind, it is a problem to apply the piston manually when the power supply fails.

According to this invention a master cylinder assembly of the kind set forth includes a second piston adapted to be applied by the pedal to generate fluid pressure in said pressure space.

Preferably the first and second pistons work in opposite directions. The pistons may be arranged in a telescopic assembly defining the pressure space between them.

Conveniently the valve assembly is offset from the axes of the first and second pistons.

This invention is particularly applicable to master cylinder assemblies including a plurality of pressure spaces each having a separate outlet for connection to separate brake circuits, a first piston for pressurising each pressure space, a pedal-operated valve assembly for controlling a supply of fluid under pressure to a power chamber on the opposite side of each first piston, and a second piston for pressurising each pressure space, all the second pistons being applied by a pedal-operated member.

A master cylinder assembly according to this invention may include a modulating piston arranged to oppose movement of the first piston in the brake applying direction, and a control port in the housing leading into a control space for the modulating piston, said control port being adapted to be connected to the pressure supply through fluid control means which are arranged to equalise the pressure across the first piston in the event of a skid.

The master cylinder assembly may incorporate at least one solenoid-operated control valve responsive to deceleration of a braked wheel and adapted to cut-off the supply of fluid under pressure to a power chamber and consequently to reduce that pressure when the deceleration of the braked wheel exceeds a predetermined value.

Some embodiments of our invention are illustrated in the accompanying drawings in which:

FIG. 13 is a section of the applying means of FIG. 10 showing a modification; and FIG. 14 is a section similar to FIG. 13 but showing a further modification.

Figure 1:
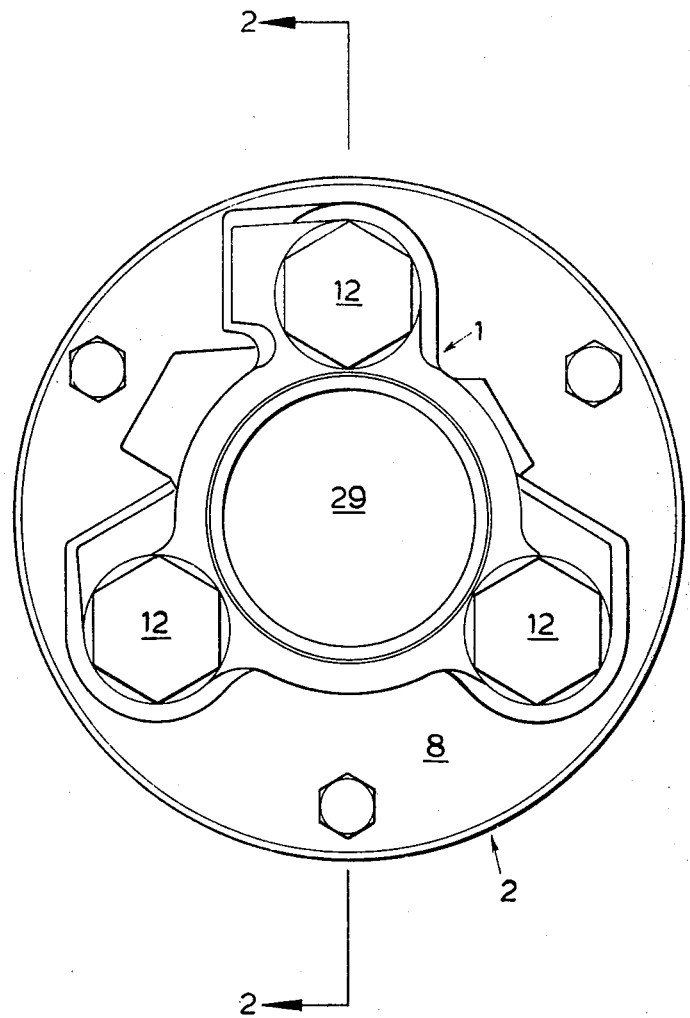
FIG. 1 is an end elevation of a master cylinder assembly.
Figure 2:
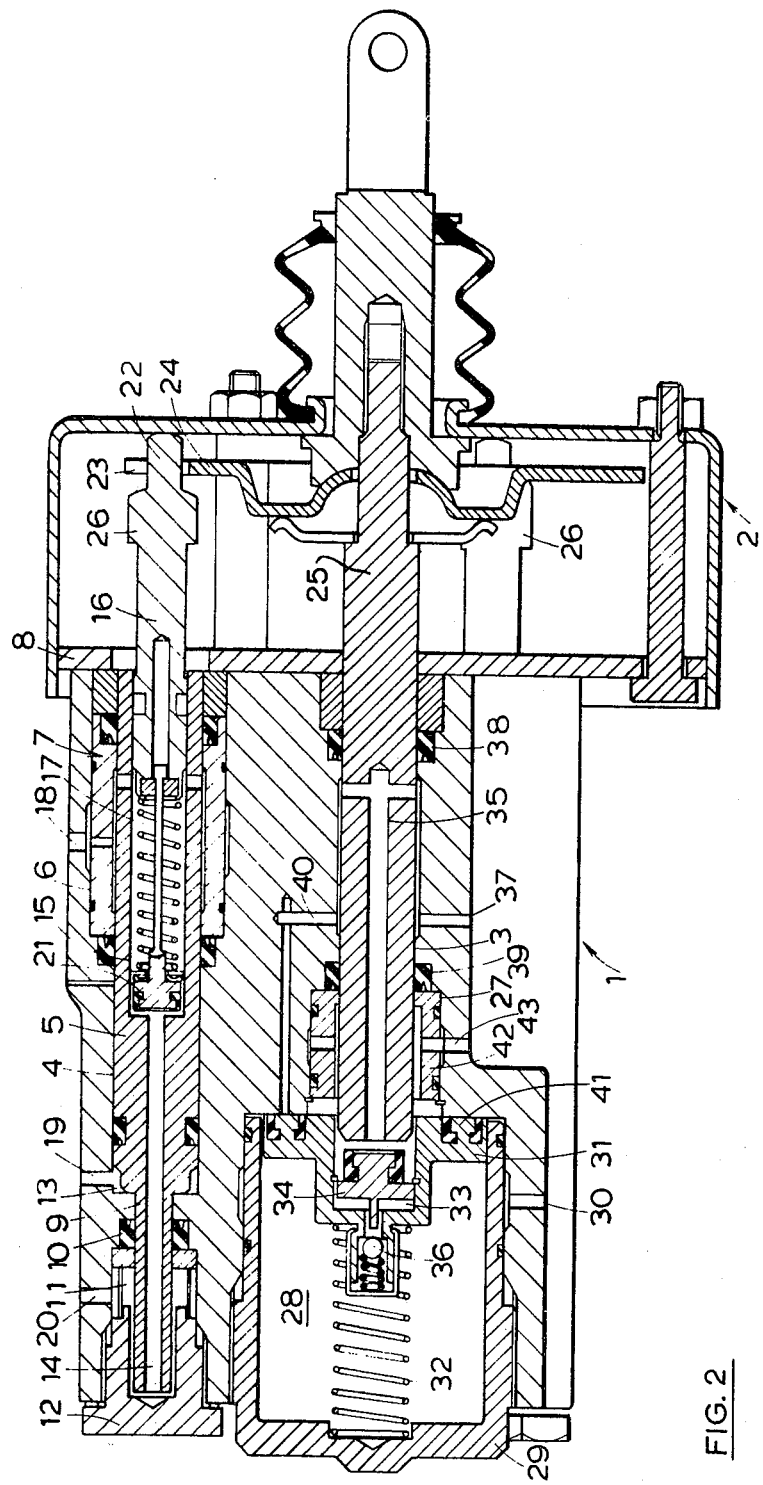
FIG. 2 is a longitudinal section on the line 2—2 of FIG. 1.

The housing of the master cylinder assembly of FIGS. 1 and 2 comprises a cylinder block 1 and a cylindrical casing 2 secured to one end of the block. Extending through the block are an axial bore 3 and three master cylinder bores 4 parallel to bore 3 but equi-angularly spaced at the same radial distance from bore 3. A first piston 5 works in each bore 4 which is counterbored at 6 to open into the casing 2, a spaced seal assembly 7 for piston 5 being held in counterbore 6 by a retaining plate 8. In the opposite direction a reduced diameter portion 9 of piston 5 extends through a seal 10 into a recess 11 which is closed by a plug 12, a power chamber 13 being defined between seal 10 and the seal on piston 5.

An axial passage 14 extends through piston portion 9 to an intermediate point in piston 5 where it is enlarged at 15 to receive a second or safety piston 16, a pressure space 17 being defined between the two pistons. An outlet port 18 for connection to a brake circuit leads into pressure space 17 via radial passages in the seal assembly 7 and piston 5. An inlet port 19 leads into the power chamber 13, and a return port 20 leading into recess 11 is adapted to be connected to a fluid reservoir. The second piston 16 carries a relatively movable centre valve member 21, spring-loaded away from the piston and normally spaced from the end of passage 14 so that normally ports 18 and 20 are in communication. Movement of either piston 5 or piston 16 towards the other will cause reservoir valve 21 to close and isolate pressure space 17 from port 20.

A rearward extension 22 from piston 16 is arranged to abut casing 2 which acts as a stop to define a limit position for piston 16. Extension 22 passes through a radial slot 23 in a circular plate 24 rockingly mounted on a pedal-operated rod 25 which is received in axial bore 3. A shoulder 26 on extension 22 is adapted to engage the edges of slot 23 when rod 25 is advanced.

The forward end of bore 3 is counterbored at 27 and then opens into a recess 28 of substantially larger diameter which is closed by a screwed cap 29 carrying spaced seals arranged on either side of an inlet port 30 for connection to an hydraulic accumulator or other supply of hydraulic fluid under pressure. A movable stop member 31 is held against the base of recess 28 by a spring 32. An axial cavity 33 in stop member 31 receives the end of rod 25 which is adapted to operate a captive valve member 34. The end of valve member 34 adjacent rod 25 is formed as centre valve to co-operate with the end of an axial passage 35 in rod 25 and the opposite end of the valve member extends through an opening in the stop member to operate an inlet ball valve 36. Axial passage 35 communicates with a reservoir return port 37 opening into bore 3 between two seals 38, 39. An axial and radial passage 40 connects return port 37 with an annulus 41 in stop member 31 defined between two ring seals. Seal 39 is held in position by a sleeve 42 in counterbore 27, the sleeve itself being a clearance fit over rod 25 and carrying spaced seals to isolate an outlet port 43. The outlet port 43 can be connected to the three inlet ports 19 by internal passageways in the cylinder block or by external connections.

In operation when the pedal is depressed rod 25 is advanced in bore 3 to engage valve member 34. This engagement seals off the connection between the three power chambers 13 and a fluid reservoir. Further forward movement of the rod 25 causes valve member 34 to open valve 36 and allow fluid under pressure in recess 28 to flow into cavity 33 and past the end of rod 25 to port 43 and so to the power chamber 13. Further movement of rod 25 is resisted by engagement of valve member 34 with the stop member which is biased towards the pedal by the pressure of fluid in recess 28 acting over the annulus 41. In this position plate 24 will just be in contact with the shoulders 26.

Pressure fluid in power chamber 13 will move pistons 5 in the rearward direction to close centre valves 21 and pressurise the three pressure spaces 17. Rearward movement of the second piston 16 is resisted by the engagement of the extensions 22 with the casing 2.

In the event of a failure in the supply of pressure fluid, stop member 31 will not resist forward movement of rod 25 and recess 28 and the power chambers will be placed in communication with reservoir. Plate 24 will pick up the second pistons 16 which will maintain reservoir valves 21 closed and in turn pressurise pressure chambers 17.

The advantage of this arrangement over an arrangement in which manual operation is applied to the normally power-operated piston, is that there is less seal friction to overcome in the failed case.

Figure 3:
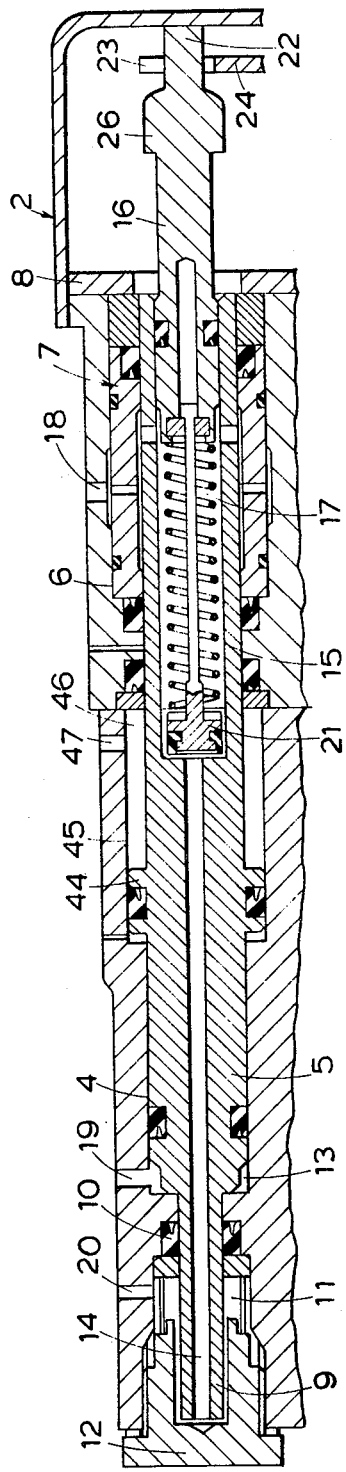
FIG. 3 is a longitudinal section through a portion of the master cylinder but modified for use in an anti-skid braking system.

FIG. 3 shows how piston 5 can be modified for use in an anti-skid braking system. An enlarged portion 44 of the piston is sealed into an enlarged portion 45 of bore 4 and a control space 46 is defined behind this enlarged portion 44. A control port 47 leads into this control space and is adapted to be connected to the supply of pressure fluid through a solenoid control valve. Normally this valve connects port 47 to reservoir but when it is energised by skid sensing means it allows fluid under pressure into control space 46 so that equal pressures are acting on piston 5 in opposite directions. The area of piston portion 44 can be made larger than the area of piston 5 in power chamber 13 so that the pressure in the pressure space 17 is forcibly relieved. The or each control valve can form part of the master cylinder assembly.

Figure 4:
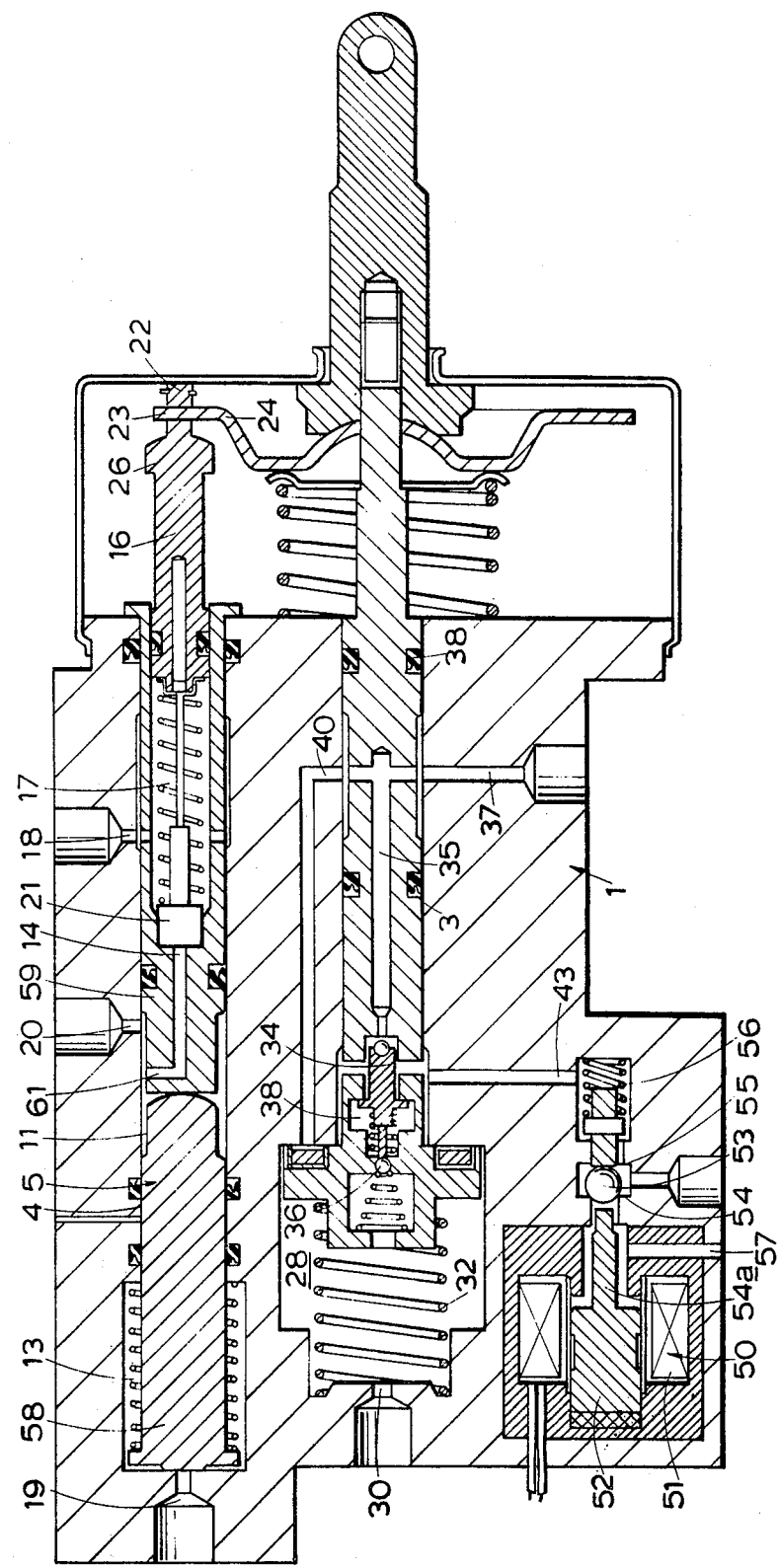
FIG. 4 is a longitudinal section through another master cylinder assembly.

The master cylinder assembly illustrated in FIG. 4 of the accompanying drawings incorporates a solenoid-operated control valve 50 for controlling communication between each outlet port 43 and each power chamber 13 through the corresponding inlet port 19 which is co-axial with the first piston 5. The solenoid-operated valve 50 comprises a solenoid coil 51 adapted to be energised by means responsive to deceleration of the wheel braked by an actuator operated by a corresponding master cylinder. The coil 51 surrounds an armature 52 which acts on a valve member 53 through a push-rod 54a The valve member 53 is alternatively engagable with a pair of spaced seatings 54, 55 and is normally held in engagement with the seating 54 by means of a compression spring 56 to provide free communication through the port 43. When the solenoid 51 is energised in response to excessive deceleration, the push-rod urges the valve member 53 into engagement with the seating 55 to cut-off communication through the port 43 with the power chamber 13. At the same time the pressure in the power chamber 13 is reduced by placing it in communication with a reservoir for fluid through an exhaust port 57.

The first piston 5 comprises a first solid pressure portion 58 exposed to pressure in the power chamber 13, and a second valve portion 59 against which the pressure portion 58 abuts. The return port 20 is provided at an intermediate point substantially the mid-point, in the length of the cylinder block 1 and communicates with the axial passage 14, which is located only in the valve portion 58, through a radial passage 61.

Due to location of the return port 20, the overall length of the assembly can be shortened in comparison with the embodiment of FIGS. 1 and 2 described above where the port is located adjacent to the end of the cylinder block 1 remote from the pedal.

The construction and operation of the embodiment of FIG. 4 is otherwise the same as that of FIGS. 1 and 2 and corresponding reference numerals have been applied to corresponding parts.

Figure 5:
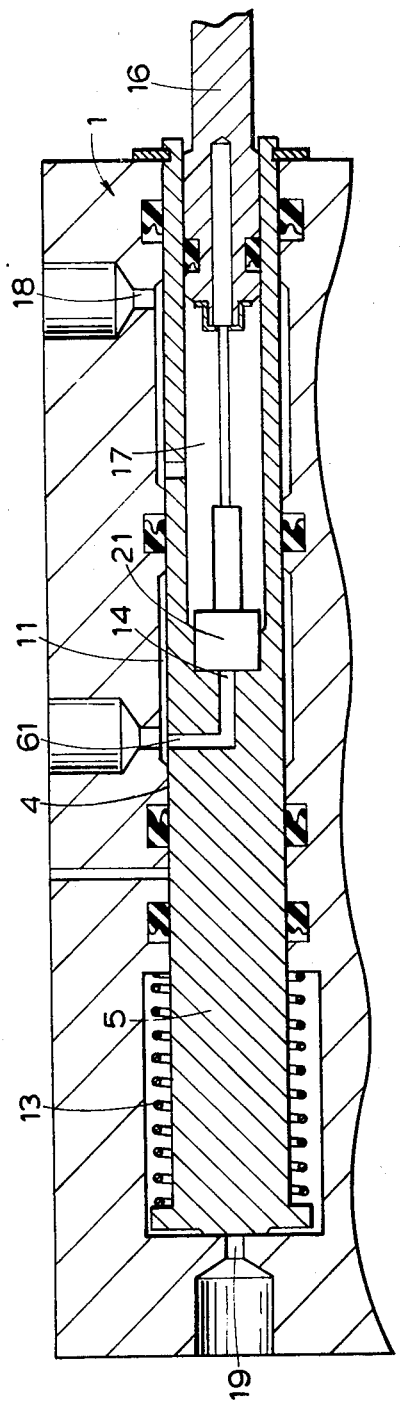
FIGS. 5–7 are longitudinal sections of portions of the master cylinder assembly of FIG. 4 but showing some modifications.

In the modified construction illustrated in FIG. 5 the piston 5 is of one-piece construction and the relative disposition of the passages 14 and 61 are the same as FIG. 4.

Figure 6:
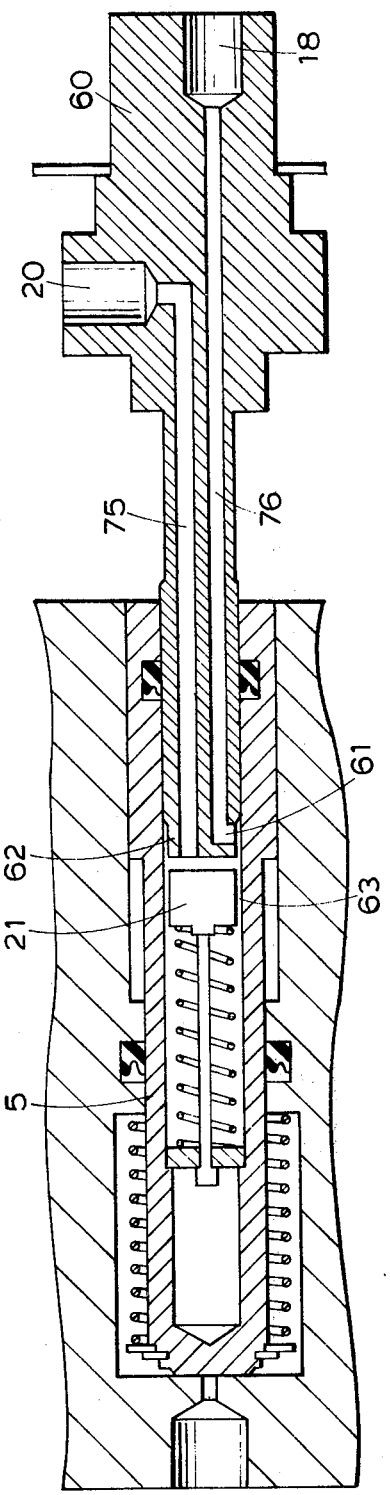

In the embodiment of FIG. 6, the ports 20 and 18 are housed in a stationary union 60, constituting the second piston, provided with longitudinally extending passages 75 and 76, the passage 76 connecting with port 18 and terminating in a radial passage 61 in an end portion 62 of reduced diameter. The union 60 is a working fit in a bore 63 in the first piston 5 into which it extends. The reservoir valve 21 is coupled to the first piston 5 and is engagable with a seating surrounding the inner end of passage 75 connecting with port 20. Ports 20 and 18 are respectively connected to a reservoir and to the brakes by means of flexible hoses.

In the event of a failure of the boost pressure the brakes are applied by engagement of the plate 24 with the union 60 which is advanced to pressurise the fluid in the pressure space between union 60 and the first piston 5.

Figure 7:
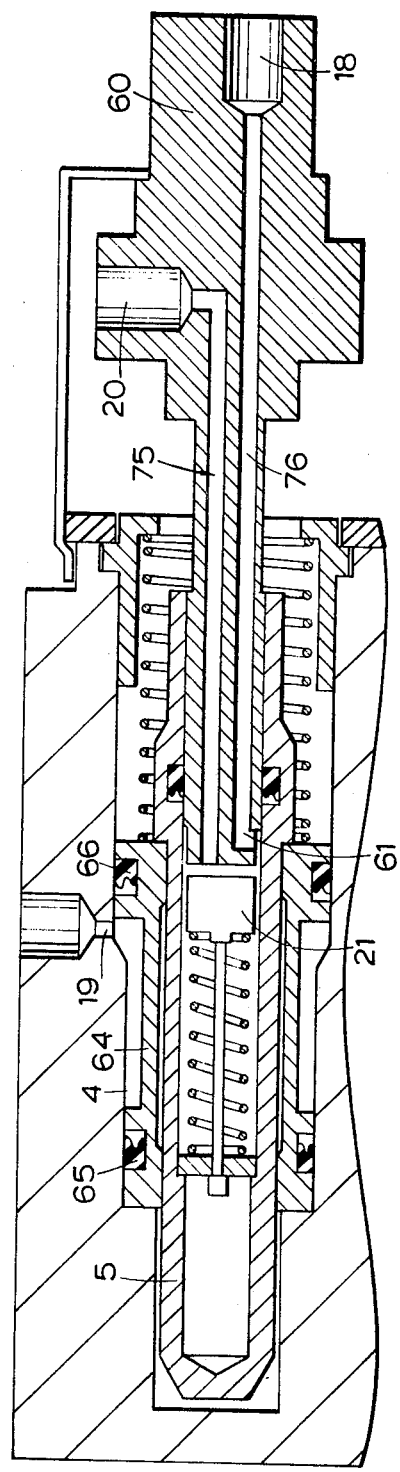

In the construction illustrated in FIG. 7 the first piston 5 works through a sleeve 64 of stepped outline which, in turn, works in the bore 4 which is of complementary stepped outline. The inlet port 19 is radially arranged in the cylinder block 1 and communicates with a recess in the wall of the sleeve 64 between spaced seals 65 and 66.

Figure 8:
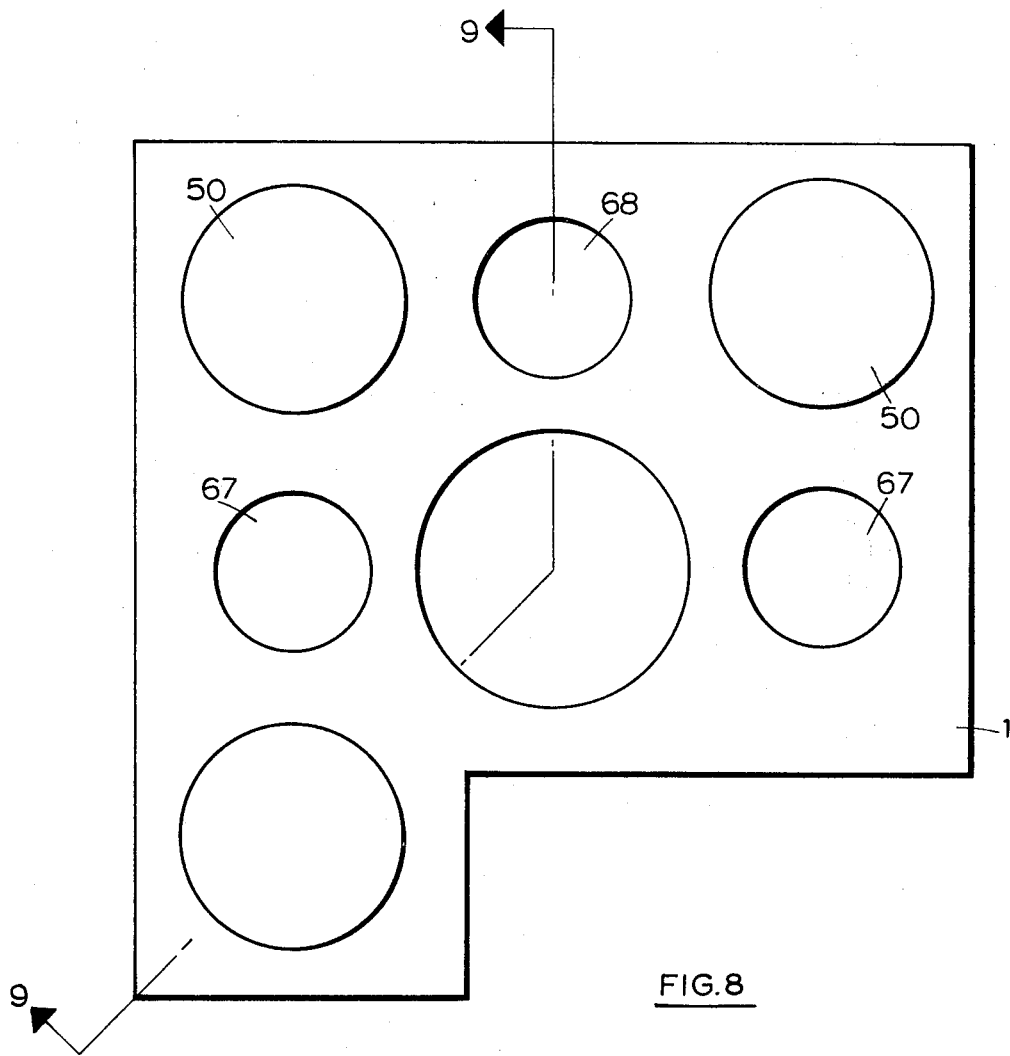
FIG. 8 is an end elevation of another master cylinder assembly.
Figure 9:
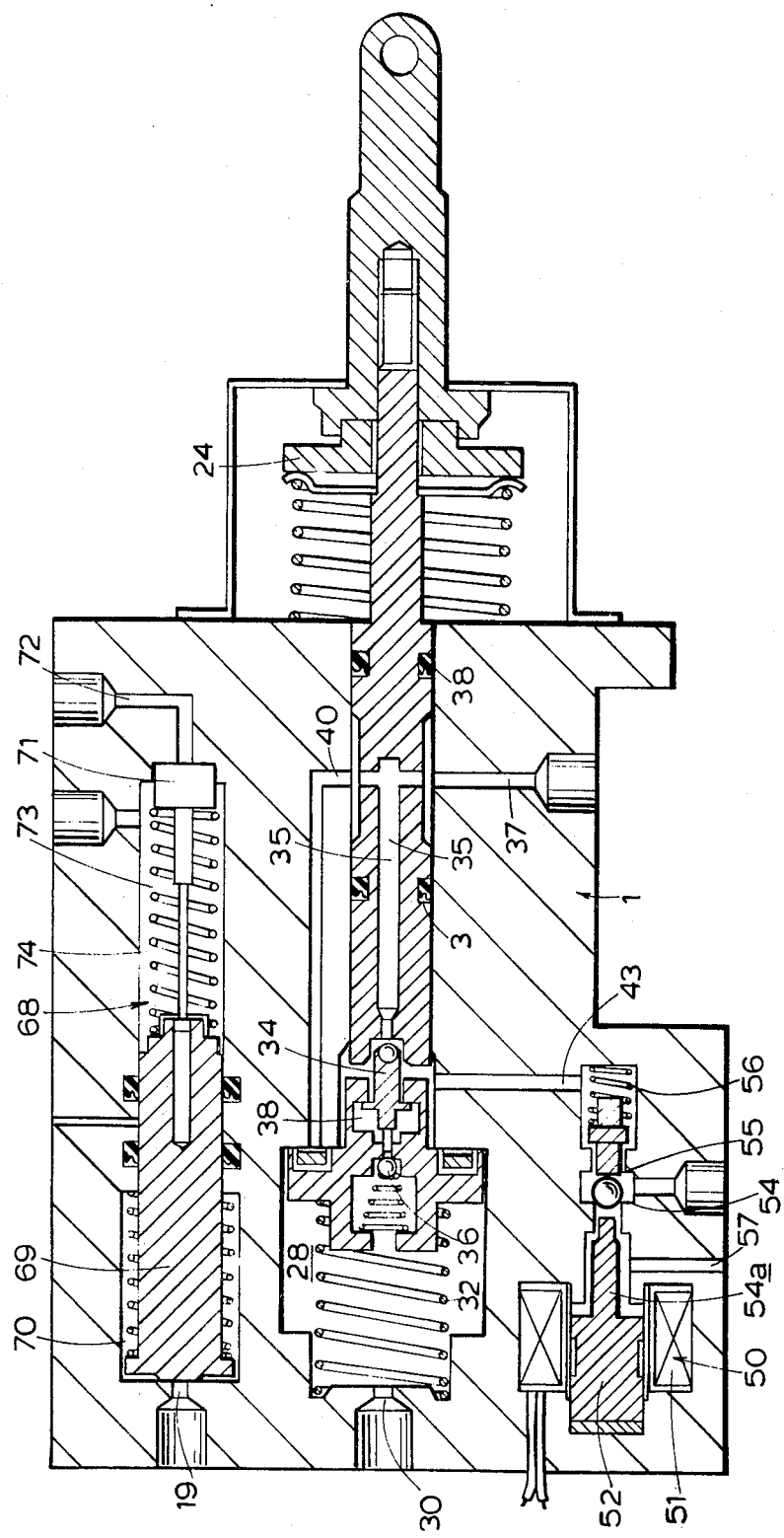
FIG. 9 is a section on the line 9—9 of FIG. 8.
Figure 12:
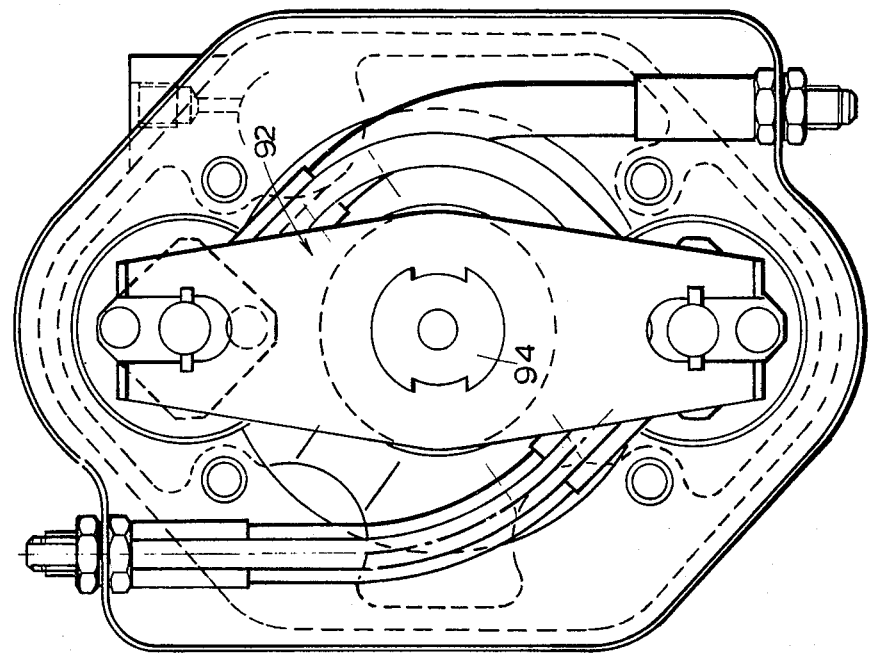
FIG. 12 is a view of the opposite end of the master cylinder with an end cap removed for clarity.
Figure 10:
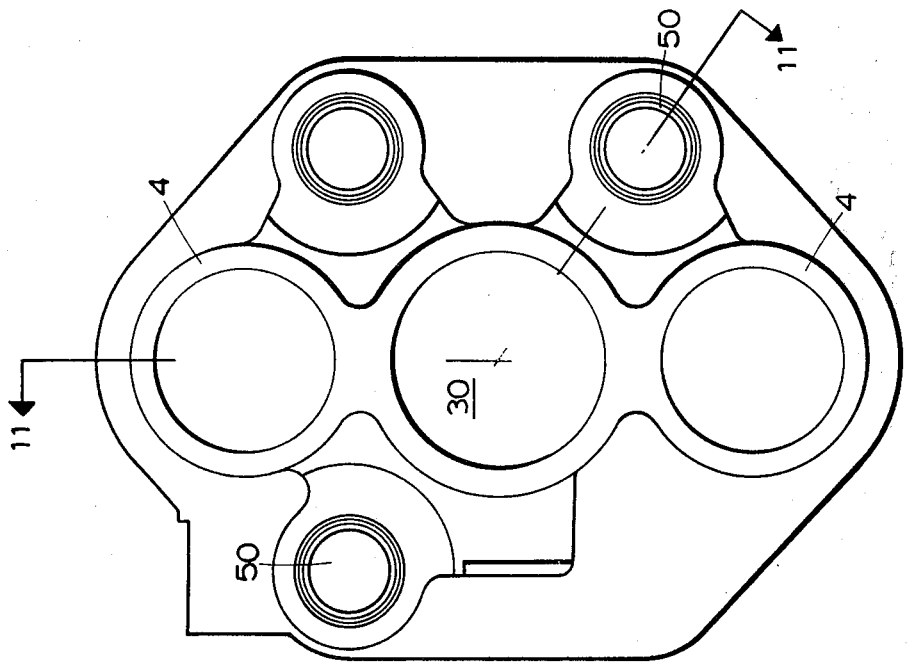
FIG. 10 is a view of one end of a master cylinder.
Figure 11:
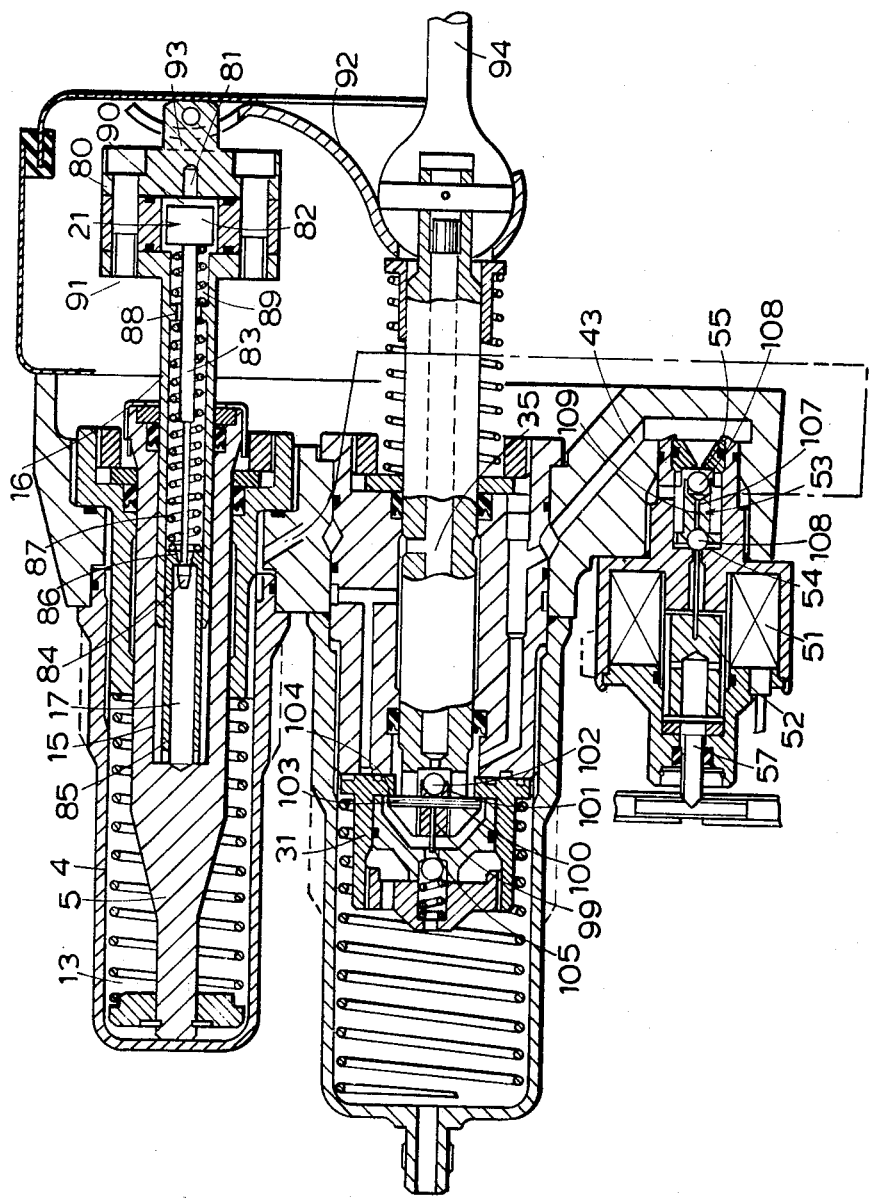
FIG. 11 is a section on the line 11—11 of FIG. 10.

In the master cylinder assembly illustrated in FIGS. 8 and 9 of the drawings the cylinder block 1 incorporates two master cylinders 67 for operating front wheel brakes, and a master cylinder 68 for operating the rear wheel brakes. Each master cylinder is controlled by a solenoid-operated control valve 50.

The master cylinders 67 may be of the construction described above with reference to FIGS. 1–4. However, the master cylinder 68 comprises a pressure piston 69 exposed to pressure in a power chamber 70 and coupled to a recuperation valve 71 controlling communication between a reservoir inlet port 72 and a brake port 73 leading from a pressure space 74.

In this construction in the event of power failure, only the master cylinders 67 can be operated manually with the plate 24 acting on the second pistons of the master cylinders 67.

An advantage of these constructions is that the normally power-operated pistons 5 are remote from the driver's foot and the second pistons are adjacent so that in the case of a failure of the power supply actuation of the second pistons 16 is not resisted by seal friction and return springs associated with the pistons 5.

The master cylinder assembly illustrated in FIGS. 10–13 of the drawings is a modification of the master cylinder assemblies described above and corresponding reference numerals have, where appropriate, been applied to corresponding parts.

Both second pistons 16 are hollow and are closed at their outer ends by a wall 80 incorporating a port 81 for connection to a reservoir for fluid and the bores 15 in the first pistons 5 in which the piston 16 works are blind. Each recuperation valve 21 comprises a valve head 82 for engagement with a seating surrounding the port 81 in the wall 80, and a stem 83 carrying the valve head and provided at its free end with an integral head 84. The stem 83 is coupled to a sleeve 85 on which the pistons works by passing the head 84 through an opening 86 in the adjacent closed end of the sleeve 85 which is of a diameter smaller than that of the head 84 but greater than that of the stem 83. A compression spring 87 acts between the sleeve 85 and abutment 88 in the piston 16 to urge the sleeve 85 against the first piston 5 and a second compression spring 89 acts between the abutment 88 and the head 82 to urge the head 82 towards the seating.

When the power chamber 13 is pressurised the first piston 5 is advanced in the bore 4 relative to the second piston 16 which abuts against the end plate forming a stop so that the valve head 82 engages with its seating to cut-off communication between the reservoir and a recess 90 in which the valve head is located. Thereafter, the fluid in the pressure space 17 between the piston 5 and 16 is pressurised and is supplied to the brakes through a passage 91 in a wall of the piston 16 and communicating with the recess 90.

Upon failure of the power supply the second pistons 16 are advanced in the bores 15, initially to close the recuperation valves 21, and thereafter to pressurise the pressure spaces 17 as described above. The second pistons 16 are operated simultaneously through a common balance bar 92 after lost-motion defined by a clearance 93 between the bar 92 and the pistons has been taken-up. The input member 94 acts directly on the balance bar 92 but, in the modification of FIG. 13, it acts on the bar 92 through a telescopic assembly 96 embodying resilient means comprising a rubber buffer 97 which is compressible in order to provide a pedal movement greater than that required just to operate the valve controlling pressurisation of the power chamber 13. Thus it provides a reaction or pedal "feel".

The valve member 34 comprises a body portion 98 which is provided with a longitudinally extending bore 99 and a diametrical bore 100 traversing the bore 99. The bore 99 is counterbored at one end at 101 to receive a ground hardened steel ball 102 which engages with a ground hardened transverse pin 103 projecting from opposite ends of the bore 100 and engageable with a stop defined by a face 104 within the stop member 31. The ball 102 is engageable with a seating surrounding the passage 35, and a ground hardened pin 105 engaging at its inner end with the transverse pin 103 is adapted to engage with the inlet ball valve 36 to open that valve after the seating has engaged with the ball 102. The ball valve 36 also comprises a hardened steel ball.

The effective length of the valve member 34 can be controlled by the length of the pin 105 and the diameters of the pin 103 and the ball 102 relative to a fixed datum which can be adjusted by machining the face 104. Thus we can ensure that the power valve assembly will operate before the balance bar 92 has moved through a distance sufficient to take-up the clearances 93.

The valve member 53 comprises a body member 106 provided with a longitudinally extending bore 107 which is counterbored at opposite ends to receive a pair of ground hardened steel balls 108 for alternative engagement with the seatings 54 and 55. The balls 108 are held in a spaced relationship by the engagement with opposite ends of a ground hardened steel pin 109 of which the length determines the effective length of the valve member 53.

The construction and operation of the master cylinder assembly is otherwise the same as the embodiments described above and need not be described further herein.

In the modified construction illustrated in FIG. 14 the bar 92 comprises a circular plate connected to a valve-operating plunger 111. The plate has a central opening 110 through which extends a stem of the plunger 111 which is of a diameter less than that of the opening 110 so that the plate can tilt with respect to the plunger. The rubber buffer 97 abuts against the plate 92 and, at its opposite end, is in abutment within an end cap 112 on which the rod 95 acts and which is guided to slide in a sleeve like portion 113 of the fixed housing of the master cylinder. The end cap 112 is of cylindrical outline and is guided at spaced positions between angularly spaced axially extending deformations 114 which are deformed inwardly from the wall of the portion 113.

In another construction the master cylinder is provided with at least two power chambers and a single common solenoid-operated valve is provided to regulate simultaneously the supply of pressure fluid to two of the power chambers. This has the advantage that the brakes on the wheels of one axle of a vehicle can be controlled together, and independently of, the brakes on the wheels of another axle.

I claim:

1. A master cylinder assembly for a vehicle braking system comprising a housing, a first piston in said housing, a first stop with which said first piston is engagable in a retracted position and away from which said first piston is movable into an operative position, a second piston in said housing aligned axially with said first, a second stop with which said second piston is engagable in a retracted position and away from which said second piston is movable towards said first piston into an operative position, a pressure space in said housing between said first and second pistons, said housing having an outlet from said pressure space for connection to a wheel brake, means in said housing defining a power chamber on the side of said first piston opposite said pressure space and adapted to be pressurised to urge said first piston towards said second piston to pressurise said pressure space, a pedal-operated valve assembly for controlling a supply of fluid under pressure to said power chamber, and a connection between said pedal and said second piston to transmit a force to said second piston to urge same towards said first piston to pressurise said pressure space upon failure of said power chamber, said connection disallowing movement of said second piston away from said second stop whilst said power chamber is pressurised to urge said first piston away from said first stop, and said first piston engaging with said first stop when said pressure space is pressurised by movement of said second piston towards said first piston.

2. A master cylinder assembly as claimed in claim 1, wherein said first and second pistons comprise a telescopic assembly, and said pressure space is defined between said pistons.

3. A master cylinder assembly as claimed in claim 1, wherein said valve assembly is offset from the axes of said first and second pistons.

4. A master cylinder assembly as claimed in claim 1, including a modulator piston arranged to oppose movement of said first piston in the brake applying direction, and said housing is provided with a control port leading into a control space for said modulator piston, fluid control means which are arranged to equalise the pressure across said first piston in the event of a skid being provided to connect said control port to said pressure supply.

5. A master cylinder assembly as claimed in claim 4, wherein said first piston and said modulator piston are included in a stepped piston.

6. A master cylinder assembly as claimed in claim 5, wherein said solenoid-operated control valve is normally open so that fluid under pressure can be supplied to said power chamber, anti-skid sensing means for emitting a signal to energise said solenoid and close said control valve being provided.

7. A master cylinder assembly as claimed in claim 1, wherein said first piston comprises first and second abutting piston parts with said piston part adjacent to said second piston being provided with the passage for connecting a pressure space to an outlet port, a valve member for closing said passage in said piston port being connected to said second piston, said passage being closed on relative movement of said first and second pistons reducing the separation between said pistons.

8. A master cylinder assembly as claimed in claim 1, wherein said first piston comprises a single member provided with communicating axial and radial passages for connecting a pressure space to an outlet port, a valve member carried by said second piston for closing the end of said axial passage remote from said radial passage on relative movement of the first and second pistons reducing the separation between said pistons.

9. A master cylinder assembly as claimed in claim 1, wherein a stationary union provided with passages for connection to a reservoir for fluid and a wheel brake respectively is arranged axially of said first piston, and a valve member carried by said first piston is operative to close the said passage in said union for connection to said reservoir when said first piston is moved axially in response to fluid pressure whereby fluid in a pressure space between said first piston and said union is pressurised for supply to said wheel brake.

10. A master cylinder assembly as claimed in claim 9, wherein said piston is open at one end and slidably receives the inner end of said union with said passage for connection to said wheel brake terminating in a radial port in an inner end portion of said union which is of reduced diameter, said inner end portion at all times being located within said first piston.

11. A master cylinder assembly as claimed in claim 1, wherein said pedal-operated valve assembly comprises first and second axially spaced valve members for engagement with first and second corresponding axially spaced seatings to control communication respectively between a pressure connection with a source of high pressure fluid and a space between the seatings, and between said space and said power chamber and, in an inoperative position, said first valve member is engageable with said first seating and said second valve member is spaced from said second seating to place said power chamber in communication with a reservoir return passage for connection to a reservoir for fluid, a pedal-operated member incorporating said second seating being movable axially initially to cause said second seating to engage with said second valve member to isolate said space from said reservoir return passage and, subsequently upon movement in the same direction to urge said first valve member away from said first seating to place said pressure connection in communication with said power chamber, said second valve member comprising a body portion provided with a diametrical bore, a diametrically projecting pin received in said diametrical bore and engagable at opposite ends with a face forming a stop which defines said inoperative position of the second valve member, and said body portion has a longitudinally extending bore which is counterbored from the end adjacent to said second seating, a ball received in said counterbore for engagement with said pin and for engagement by said second seating to isolate said space from said reservoir return passage, an axially extending pin forming a pushrod engaging at its inner end with said diametrically projecting pin and at its opposite end projecting from said longitudinally extending bore to engage with and urge said first valve member away from said first seating when said pedal is operated.

12. A master cylinder assembly as claimed in claim 11, wherein said stop face defines a datum position upon which depends the relative positions of components comprising said second valve member.

13. A master cylinder assembly as claimed in claim 11 wherein said first valve member comprises a hardened steel ball.

14. A master cylinder assembly as claimed in claim 1, wherein said second piston is provided with a recuperation port for connection to a reservoir for fluid and an axially movable valve member for engagement with said recuperation port is coupled to said first piston, and said second piston is provided with a longitudinally extending bore, and an end wall closing one end of said longitudinally extending bore defines a valve seating which surrounds said recuperation bore, said axially movable valve member comprising a valve head for engagement with said seating to close said port when said pistons are moved relatively towards each other, an axially extending stem having a first end carrying said valve head and a second opposite end having an enlarged head, a sleeve with which said enlarged head is in coupled engagement and in which said stem is movable upon relative movement of said pistons towards each other, and a spring acting to urge said sleeve into engagement with said first piston whereby upon movement of said pistons away from each other said valve head is withdrawn from said seating.

15. A master cylinder assembly as claimed in claim 14, wherein said valve head is located within a recess of increased diameter defined by said wall of said second piston, and said wall incorporates a passage for connection to a wheel brake.

16. A master cylinder assembly as claimed in claim 1, wherein said pedal-operated valve assembly comprises a pedal-operated member coupled to said second pistons through said connection, and a stop member movable between an operative position and a retracted position spaced from said operative position, said stop member normally being exposed to pressure in said power chamber which biases said stop member to said operative position to prevent said pedal-operated member from being advanced through a distance sufficient to transmit a force to said second piston, and reduction in said pressure allowing said stop member to move into said retracted position in response to an applying force applied to said pedal which force is also transmitted to said second piston through said connection.

17. A master cylinder assembly for a vehicle braking system comprising a housing, a plurality of first pistons in said housing, first stop means with which each said first piston is engagable in a retracted position and away from which each said first piston is movable into an operative position, a plurality of second pistons in said housing corresponding in number to and aligned axially with corresponding first pistons, second stop means with which each said second piston is engagable in a retracted position and away from which each said second piston is movable towards a corresponding one of said first pistons into an operative position, pressure spaces in said housing between each said first and second pistons, said housing having a separate outlet from each said pressure space for connection to a wheel brake, means in said housing defining power chambers on the side of each said first pistons opposite a corresponding one of said pressure spaces and adapted to be pressurised to urge the said first piston towards the corresponding said second piston to pressurise the said one pressure space, a pedal-operated valve assembly for controlling a supply of fluid under pressure to all said power chambers a pedal-operated member, a connection between said pedal-operated member and said second pistons to transmit a force to said second pistons to urge same towards said first pistons to pressurise said pressure spaces upon failure of said power chambers, said connection disallowing movement of said second pistons away from said second stop means whilst said power chambers are pressurised to urge said first pistons away from said first stop means, and said first pistons engaging with said first stop means when said pressure spaces are pressurised by movement of said second pistons towards said first pistons.

18. A master cylinder assembly as claimed in claim 17, wherein each said pressure space is defined as the space between one of said first and one of said second pistons arranged telescopically.

19. A master cylinder assembly as claimed in claim 17, wherein the axes of said second pistons and of said valve assembly are arranged in parallel, with said valve assembly in between said second pistons.

20. A master cylinder assembly as claimed in claim 17, wherein there are at least three pressure spaces, and said second pistons are angularly spaced around an axial valve assembly.

21. A master cylinder assembly as claimed in claim 17, wherein said pedal-operated member is adapted to operate said valve assembly and a tilting plate arranged to pick up the second pistons is adapted to be operated by said pedal-operated member after said valve assembly has been operated.

22. A master cylinder assembly as claimed in claim 17, wherein said valve assembly comprises a normally open reservoir valve, a normally closed power valve, and a movable stop member biassed towards the pedal-operated member by the supply of fluid under pressure and in which said power valve is housed, said pedal-operated member picking up said stop member after said reservoir and power valves have been operated.

23. A master cylinder assembly as claimed in claim 22, wherein said stop member is provided with a face seal normally urged into engagement with a seating by said supply of fluid under pressure.

24. A master cylinder assembly as claimed in claim 17, incorporating at least one solenoid-operated control valve responsive to deceleration of a braked wheel and adapted to cut-off the supply of fluid under pressure to at least one of said power chambers and consequently to reduce that pressure when the deceleration of the braked wheel exceeds a predetermined value.

25. A master cylinder assembly as claimed in claim 24, wherein said solenoid-operated control valve comprises a pair of axially spaced seatings, a single valve member alternatively engageable with said seatings to control communication between said source of high pressure fluid and said power chamber, and between said power chamber and a reservoir for fluid.

26. A master cylinder assembly as claimed in claim 24, wherein there are at least two power chambers and a separate solenoid-operated control valve is provided for each power chamber.

27. A master cylinder assembly as claimed in claim 24, wherein there are at least two power chambers and a common solenoid-operated control valve is provided for two of said power chambers.

28. A master cylinder assembly as claimed in claim 25, wherein the valve member comprises a longitudinally bored body portion having counterbores at opposite ends, a pair of balls accommodated within said counterbores, and a pin located in said longitudinal bore and engaged at opposite ends by said balls to determine the effective length of said valve member.

29. A master cylinder assembly as claimed in claim 17, wherein said pedal-operated member acts on the second pistons through a balance bar, and means is interposed between said pedal-operated member and said balance bar to compensate for any out of balance moments in said balance bar.

30. A master cylinder assembly as claimed in claim 29, wherein said means is resilient and is constructed and arranged both to distort and to compress.

31. A master cylinder assembly as claimed in claim 29, wherein said means is resilient and is constrained for compressive movement only in an axial direction, and a pair of relatively slidable telescopic members are incorporated between which opposite ends of said resilient means are connected.

32. A master cylinder assembly as claimed in claim 17, wherein each of said first pistons is provided with a through passage normally connecting the associated pressure space to an outlet adapted to be connected to reservoir, said second piston carrying a valve member adapted to close said passage on relative movement of the first and second pistons reducing the separation between said pistons.

* * * * *